US011042593B2

(12) United States Patent
Demsey

(10) Patent No.: US 11,042,593 B2
(45) Date of Patent: *Jun. 22, 2021

(54) SYSTEMS AND METHODS FOR SELECTIVE DISTRIBUTION OF ONLINE CONTENT

(71) Applicant: Verizon Media Inc., Dulles, VA (US)

(72) Inventor: Seth Mitchell Demsey, Dulles, VA (US)

(73) Assignee: VERIZON MEDIA INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,409

(22) Filed: Jun. 8, 2020

(65) Prior Publication Data

US 2020/0301980 A1 Sep. 24, 2020

Related U.S. Application Data

(63) Continuation of application No. 13/907,258, filed on May 31, 2013, now Pat. No. 10,678,869.

(51) Int. Cl.
G06F 17/00 (2019.01)
G06F 16/93 (2019.01)
G06F 16/958 (2019.01)
G06F 40/134 (2020.01)

(52) U.S. Cl.
CPC ............ G06F 16/94 (2019.01); G06F 16/958 (2019.01); G06F 40/134 (2020.01)

(58) Field of Classification Search
CPC ....... G06F 40/134; G06F 16/958; G06F 16/94
See application file for complete search history.

(56) References Cited

U.S. PATENT DOCUMENTS

| 7,216,297 | B1 | 5/2007 | Douglis et al. |
| 9,454,776 | B2* | 9/2016 | Ranganath ............ G06Q 30/02 |
| 2004/0205503 | A1 | 10/2004 | Gutta |
| 2005/0028188 | A1 | 2/2005 | Latona et al. |
| 2006/0258421 | A1 | 11/2006 | Nicholas et al. |
| 2006/0271671 | A1 | 11/2006 | Hansen |

(Continued)

OTHER PUBLICATIONS

Beeby et al. "A Guide to Web Development 101 using Webmatrix", published by Microsoft, 2011.

(Continued)

Primary Examiner — Laurie A Ries
(74) Attorney, Agent, or Firm — Bookoff McAndrews, PLLC

(57) ABSTRACT

Systems and methods are disclosed for online distribution of content. One method includes: receiving, from a first content publisher, a request to publish, on a web page of a second content publisher in a network of publishers, a link to or preview of content of the first content publisher, wherein the request includes at least one parameter associated with at least one attribute of a desired viewer of the link to or preview of content; receiving, from the second content publisher in the network, a request for a link to or preview of content of a publisher in the network, the request including at least one identifier associated with a prospective viewer of a web page of the second content publisher; and determining whether to display a link to or preview of content of the first content publisher on the web page of the second content publisher.

20 Claims, 7 Drawing Sheets

(56) References Cited

U.S. PATENT DOCUMENTS

| | | |
|---|---|---|
| 2007/0005694 A1 | 1/2007 | Popkin et al. |
| 2007/0174490 A1* | 7/2007 | Choi .................... G06F 16/958 709/246 |
| 2008/0275980 A1 | 11/2008 | Hansen |
| 2009/0055267 A1 | 2/2009 | Roker |
| 2009/0055400 A1* | 2/2009 | Tu ........................ G06F 16/958 |
| 2009/0077158 A1* | 3/2009 | Riley .................... G06Q 30/02 709/202 |
| 2009/0204638 A1 | 8/2009 | Hollier et al. |
| 2009/0254437 A1 | 10/2009 | Lee et al. |
| 2009/0265243 A1 | 10/2009 | Karassner et al. |
| 2010/0145762 A1* | 6/2010 | Coladonato ........ G06Q 30/0241 705/14.4 |
| 2010/0241511 A1 | 9/2010 | Cunningham et al. |
| 2010/0241597 A1* | 9/2010 | Chen .................... G06Q 30/02 706/12 |
| 2011/0125577 A1* | 5/2011 | Song .................. G06Q 30/0255 705/14.53 |
| 2011/0179176 A1 | 7/2011 | Ravicriandran et al. |
| 2011/0191163 A1 | 8/2011 | Allaire et al. |
| 2011/0258050 A1 | 10/2011 | Chan et al. |
| 2011/0276393 A1 | 11/2011 | Srinivasan et al. |
| 2012/0197731 A1 | 8/2012 | Rampell et al. |
| 2012/0290393 A1 | 11/2012 | Johansson et al. |
| 2012/0310750 A1* | 12/2012 | Schutzbank .......... G06Q 30/02 705/14.72 |
| 2012/0317307 A1 | 12/2012 | Ravindran et al. |
| 2012/0331102 A1 | 12/2012 | Ertugrul |
| 2013/0086603 A1* | 4/2013 | Kruger ............... G06F 16/9535 725/14 |
| 2013/0205235 A1 | 8/2013 | Gabara |
| 2013/0262204 A1 | 10/2013 | Stiles et al. |
| 2013/0344927 A1 | 12/2013 | Stegall |
| 2015/0193390 A1 | 7/2015 | Stekkelpak et al. |
| 2015/0294000 A1* | 10/2015 | Grant .................... G06Q 20/10 707/706 |
| 2016/0239881 A1* | 8/2016 | Bhandari ............. G06Q 30/02 |
| 2017/0277796 A1 | 9/2017 | Kim |

OTHER PUBLICATIONS

International Search Report arid Written Opinion dated Mar. 2, 2015, in corresponding International Application No. PCT/US2014/39808 (9 pages).

* cited by examiner

|  | R1Y | R6M | R3M | R1M | R2W | R1W | R1D |
|---|---|---|---|---|---|---|---|
| U.S. | $1.00 | $0.75 | $0.70 | $0.65 | $0.75 | $0.70 | $0.70 |
| U.S. EAST COAST | $1.25 | $1.00 | $0.85 | $0.80 | $1.00 | $0.90 | $0.90 |
| NYC | $1.50 | $1.25 | $1.20 | $1.15 | $1.25 | $1.00 | $1.00 |
| NYC + STUDENT | $1.75 | $1.75 | $1.75 | $1.75 | $1.75 | $1.50 | $1.75 |
| NYC + STUDENT + COMPUTERS | $2.00 | $2.00 | $2.00 | $2.00 | $2.00 | $2.00 | $2.00 |

FIG. 6

SYSTEMS AND METHODS FOR SELECTIVE DISTRIBUTION OF ONLINE CONTENT

CROSS-REFERENCE TO RELATED APPLICATION(S)

This patent application is a continuation of and claims the benefit of priority to U.S. application Ser. No. 13/907,258, filed on May 31, 2013, the entirety of which is incorporated herein by reference.

TECHNICAL FIELD

Various embodiments of the present disclosure relate generally to managing the distribution of online content. More specifically, exemplary embodiments of the present disclosure relate to systems and methods for selectively controlling the distribution of content over the Internet between various websites.

BACKGROUND

In order to attract Internet users to view their websites, owners of Internet websites use various methods of promotion and forms of advertising their websites, such as by advertising on television, radio, newspapers, magazines, flyers, billboards, and other means. These means rely on viewers of the promotion or advertisements remembering the advertisements when they have access to the Internet, e.g. when the viewer has access to their web-enabled mobile device or computer. However, many viewers may not recall the website name or may forget about the promotion or advertisement for the website altogether.

In order to avoid relying on a viewer's memory of the website based on viewing the promotion or advertisement, and any added effort needed by the viewer to locate the website, many websites promote their website and/or place advertisements for their website on other websites in the form of a clickable link or image. For example, websites often pay Internet search engines and web email sites to display an advertisement or to promote their website. For example, some websites display an advertisement for another website and may receive revenue each time a user clicks on the advertisement so as to be navigated to the advertiser's website. This form of website advertising is often referred to as "pay-per-click."

In addition, some websites share previews of their content on other websites via a link exchange. A link exchange is an association of websites that exchange links to content. For example, a first website may send content from its website to a second website in the form of a preview of content to be displayed on the second website, and the second website may do the same with the first website. This exchange of content may be associated with a payment scheme, such as a "pay-per-impression" or "pay-per-click" payment. However, the above forms of website promotion and advertising do not differentiate between various different users.

Accordingly, a need exists for systems and methods for facilitating selective distribution of website content. More specifically, a need exists for systems and methods for selectively distributing or syndicating website content that is targeted to viewers having specific attributes. The present disclosure is directed to improving the distribution of website content by allowing tailoring of distribution to viewers based on attributes of the viewer.

SUMMARY OF THE DISCLOSURE

According to certain embodiments, computer-implemented methods are disclosed for executing an online auction of diverse online advertisements. One method includes Systems and methods are disclosed for online distribution of content. One method includes: receiving, from a first content publisher, a request to publish, on a web page of a second content publisher in a network of publishers, a link to or preview of content of the first content publisher, wherein the request includes at least one parameter associated with at least one attribute of a desired viewer of the link to or preview of content; receiving, from the second content publisher in the network, a request for a link to or preview of content of a publisher in the network, the request including at least one identifier associated with a prospective viewer of a web page of the second content publisher; determining, based on the at least one identifier and the at least one parameter, whether to display a link to or preview of content of the first content publisher on the web page of the second content publisher; and transmitting, to the second content publisher, the link to or preview of content of the first content publisher, based on the determination.

According to certain embodiments, systems are disclosed for online distribution of content. One system includes a data storage device storing instructions for executing an online distribution of content; and a processor configured to execute the instructions to perform a method including: receiving, from a first content publisher, a request to publish, on a web page of a second content publisher in a network of publishers, a link to or preview of content of the first content publisher, wherein the request includes at least one parameter associated with at least one attribute of a desired viewer of the link to or preview of content; receiving, from the second content publisher in the network, a request for a link to or preview of content of a publisher in the network, the request including at least one identifier associated with a prospective viewer of a web page of the second content publisher; determining, based on the at least one identifier and the at least one parameter, whether to display a link to or preview of content of the first content publisher on the web page of the second content publisher; and transmitting, to the second content publisher, the link to or preview of content of the first content publisher, based on the determination.

According to certain embodiments, a computer-readable medium is disclosed storing instructions that, when executed by a processor, cause the processor to execute an online distribution of content, including: receiving, from a first content publisher, a request to publish, on a web page of a second content publisher in a network of publishers, a link to or preview of content of the first content publisher, wherein the request includes at least one parameter associated with at least one attribute of a desired viewer of the link to or preview of content; receiving, from the second content publisher in the network, a request for a link to or preview of content of a publisher in the network, the request including at least one identifier associated with a prospective viewer of a web page of the second content publisher; determining, based on the at least one identifier and the at least one parameter, whether to display a link to or preview of content of the first content publisher on the web page of the second content publisher; and transmitting, to the second content publisher, the link to or preview of content of the first content publisher, based on the determination.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 6 is a simplified table of a chart categorizing attributes of various Internet users, which may be used by an exemplary embodiment of the present disclosure.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes systems and methods for online distribution of electronic content between various websites, including various types of content and/or advertisements, such as articles, headlines, images, and videos. According to embodiments of the present disclosure, content may be distributed between a plurality of websites, each of which may wish to promote its website to potential viewers on other websites and/or may wish to receive payment from other websites for allowing promotional information or advertising to be published on its website. The websites may be members of a network of websites that agree to exchange promotional content. In this network, each member website may submit, to a central source, such as a server, parameters of attributes it is seeking in a viewer, such as how recently the potential viewer has previously visited its website (recency), how frequently the potential viewer visits its website (frequency), and any demographic information, e.g. the geographic location of the potential viewer. When a viewer attempts to access a website that is a member of the network, the website may send information about the prospective viewer to the server(s), which may determine, based on the parameters received from other website members of the network and the attributes of the prospective viewer, which other website's promotional content/advertisement to publish on the website the prospective viewer is attempting to view.

Figure 1:
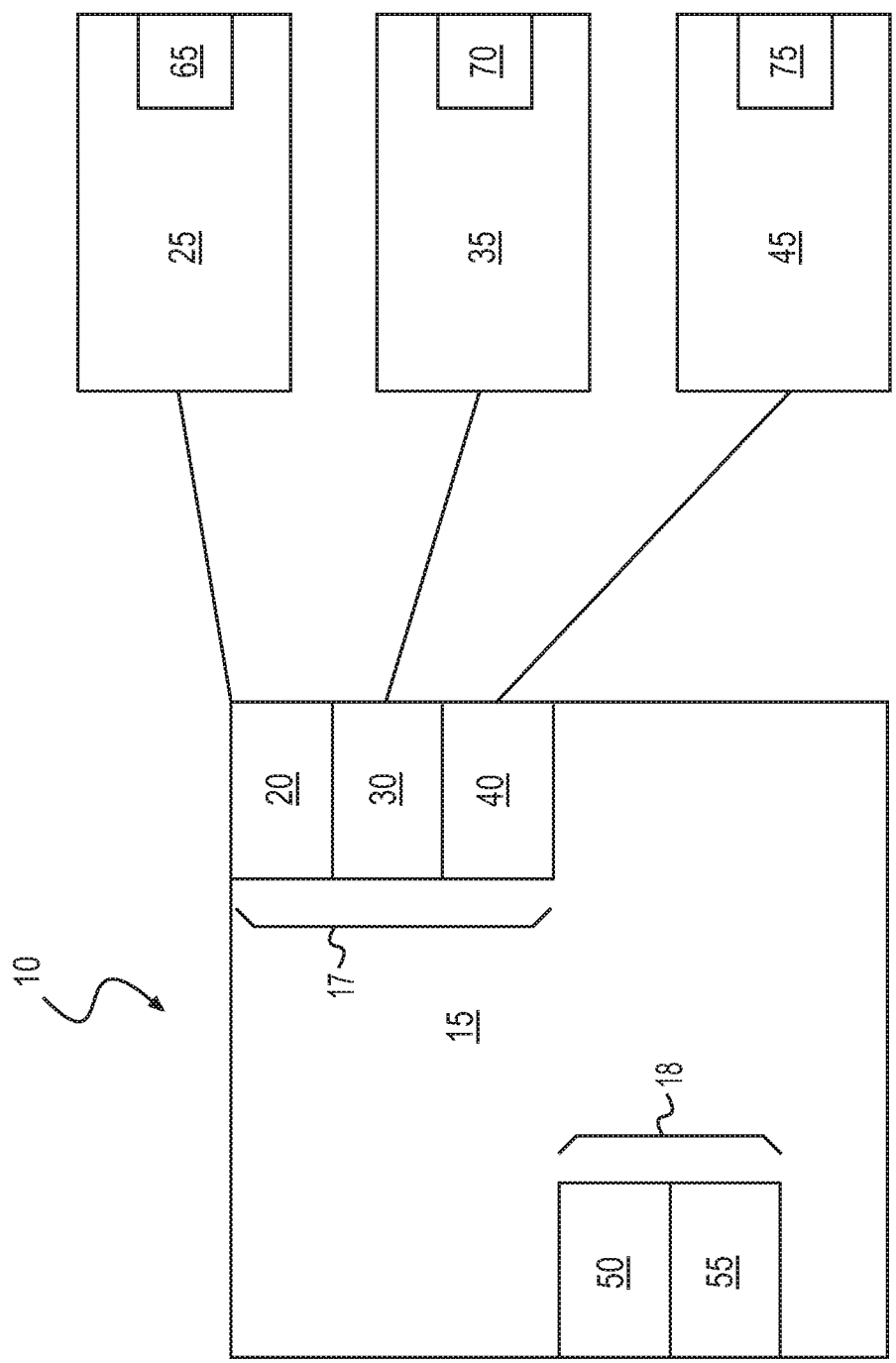
FIG. 1 is a schematic diagram of an arrangement by which website content and advertisements may be distributed between online entities, according to an exemplary embodiment of the present disclosure.

FIG. 1 illustrates an exemplary conceptual framework 10 for implementing distribution of Internet content. FIG. 1 depicts a primary content publisher (PCP) website 15. The PCP website 15 may be one of a plurality of related websites served from a single web domain or related web domains. The PCP website 15 may be any web document or other web resource that may be accessed through a web browser. The PCP website 15 may be in any suitable format that is accessible by a web browser, such as, in HTML or XHTML format. The PCP website 15 may include text, graphics, video, images or any other types, or combination of types, of content viewable by a web browser. For example, the PCP website 15 may be primarily directed to financial news and may include current news about financial markets, with text, graphics, and images relating to financial markets. Of course, PCP website 15 may be related to any other type of subject matter or content. While PCP website 15 is described and depicted in the appended drawings as being a "PCP" website, it should be appreciated that the acronym and its representation of a "primary" content publisher is only used to describe that publisher relative to other publishers, which may be equivalent or similar, peer publishers or websites, whether or not they are "external" or "secondary."

In one embodiment, the PCP website 15 may have a portion 18 of advertisements including one or more advertisements 50, 55. The advertisement portion 18 may be of any size, type, and/or configuration and may be displayed anywhere on the website 15. For example, advertisement 50 may be a banner ad or other form having a clickable portion that links to the advertiser's website, or a website associated with the advertiser. Advertisement 55 may be a video ad, pop-up, or any other known type of online ad.

According to certain aspects of the disclosure, the PCP website 15 may also have a portion 17 of sponsored links including one or more sponsored links 20, 30, 40. The portion 17 of sponsored links and each of the sponsored links 20, 30, 40 may be of any size, type, and/or configuration that the PCP determines. The sponsored links 20, 30, 40 may be links to websites of other content publishers or any other website that may exchange payment or exchange any item of value in return for the PCP displaying its sponsored link 20, 30, 40.

In one embodiment, the sponsored link portion 17, which may be included in the website 15, may include one or more sponsored links 20, 30, 40 to so-called "external" websites 25, 35, 45 of external content publishers (ECP). Again, while ECP websites are described and depicted in the drawings as being a "ECP" websites, it should be appreciated that the acronym and its representation of an "external" content publisher is only used to describe that publisher relative to other publishers, which may be equivalent or similar, peer publishers or websites, whether or not they are "internal" or "primary." The sponsored link portion 17 of the website 15 may be displayed anywhere on the webpage and may be any size, and may include a label to indicate that it includes sponsored links. Each sponsored link, 20, 30, 40 may include text, images, video, graphics or any other web publishable content that may include one or more clickable hyper-links that may direct the viewer to an ECP website 25, 35, 45. While the drawings depict PCP website 15 as being in a link exchange or content distribution network with three ECP websites 25, 35, 45, it should be appreciated that any number or type of websites may be included in such a network, and that PCP website 15 and ECP websites 25, 35, 45, may be similar or equivalent, peer websites, or they may be different types of websites, regardless of whether they are owned by the same or different online entities.

The clickable hyper-links included in the sponsored links 20, 30, 40 may be configured to direct a viewer's web browser from website 15 to websites 25, 35, or 45, or may open a new web browser or a new web browser tab to display an ECP website 25, 35, or 45. The ECP's website 25, 35, or 45 may include a sponsored link portion (which may or may not include links back to PCP website 15 or other ECP websites) and/or may include one or more advertisements 65, 70, 75. The advertisements 65, 70, and 75 may be of any size, form, and/or configuration, such as a banner ad or other form having a clickable portion that links to the advertiser's website or a website associated with the advertiser.

As will be described in more detail below, the present disclosure relates to selectively displaying sponsored links 20, 30, 40 (which link to exemplary ECP websites 25, 35, 45) on PCP website 15 based on various parameters and attributes, such as (i) the recency, frequency, and/or demography of a potential visitor to PCP website 15, (ii) the recency, frequency, and/or demography desired by one or more of ECP websites 25, 35, 45 of a potential visitor to PCP website 15, and/or (iii) the recency, frequency, and/or demography desired by an advertiser or publisher of a visitor to an ECP website 25, 35, 45, and therefore a viewer of an advertisement 65, 70, 75.

Figure 2:
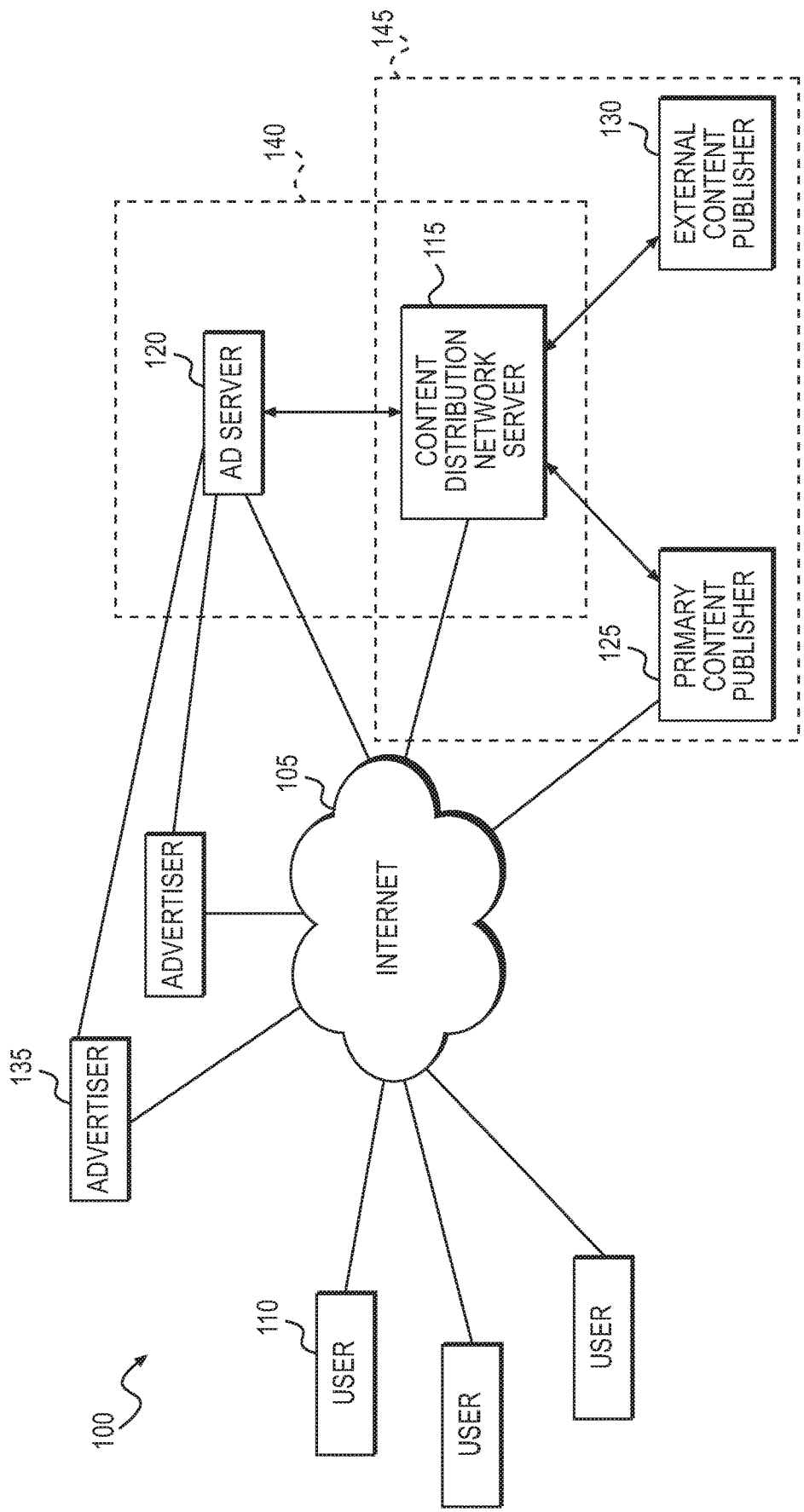
FIG. 2 is a diagram of information flow between entities involved in online distribution of web content and advertisements, according to an exemplary embodiment of the present disclosure.

FIG. 2 is a diagram showing an exemplary environment or arrangement 100 between entities involved in online distribution of web content, according to an exemplary embodiment of the present disclosure. As shown in FIG. 2 users 110 of the Internet 105 may view websites from online content publishers which may be designated as PCPs 125 or ECPs 130 depending, in one embodiment, on the order a user views the website.

As used herein, the terms "user" and "viewer" may be used interchangeably and both refer to an individual or entity accessing or attempting to access an Internet website using any device that is connected to the Internet 105, such as a computer, mobile device, television, or other device connected to, or capable of connecting to the Internet 105. The user 110 may access the Internet 105 using their device via a web browser. The web browser may save information about the user 110, such as the user's email address, other unique identity information, and/or the user's attributes, such as geographic location, website history, age, gender, search history, profession, etc. For example, the web browser may save the user's information in a cookie or other suitable storage form from which the user's information may be retrieved and be accessible to a server, such as an ad server 120 or content distribution network server (CDNS) 115.

As described above, the content publishers 125, 130 may be members of a link exchange network 145, which may include websites that may wish to exchange content with other content publishers. The CDNS 115 may be administered by one or several servers that may save and process data from member content publishers, such as information about what attributes the content publisher is seeking in a user 110. The CDNS 115 may be part of a link exchange network 145, which may distribute content among a plurality of content publishers.

The content publishers in the link exchange network 145 may be owned by or operated by the same or different entities and may be directed to the same or different types of content. For example the content of one member may be directed to providing sports news, and another member may be directed to providing movie reviews. The link exchange network 145 may be administered over the Internet 105 by one or more of the member content publishers or a separate entity that may or may not be a content publisher. The members of the link exchange network 145 may agree to share the publishing of content with other members according to various parameters that may be submitted to the administrator of the link exchange network 145, and may be changed and updated. For example, members of the link exchange network 145 may submit various parameters for sharing and publishing content from other member content publishers to a server, such as a CDNS 115. Such parameters may relate to pricing, viewer attributes, attributes of the link or preview of content, etc.

The CDNS 115 may be a separate entity from any of the members of the link exchange network 145, or may be administered by one or some plurality of the members of the link exchange network 145. Alternatively, the CDNS 115 may be operated by the same administrator as that of the ad servers 120. The CDNS 115 and ad servers 120 may be a part of an advertising and content network 140. CDNS 115 may collect payments from members of the link exchange network 145 and/or the advertising and content network 140 for performing services.

A PCP 125 may be any entity that owns or maintains a website 15 that publishes content, and in certain embodiments may be so designated based on it being the first website of the websites in the link exchange network 145 that a user 110 may visit upon opening a web browsing session, e.g. the first link exchange member website user 110 visits once the user 110 opens up his/her web browser. For example, a PCP 125 may be an operator of a blog, a news site, a web portal, an e-commerce website, a social networking website, or any other publication of web content.

An ECP 130 may be any entity that owns or maintains a website 25, 35, 45 that also publishes content and may be any website of the websites in the link exchange network 145 that a user 110 may visit subsequent to visiting the PCP 125 upon opening a web browsing session. For example, an ECP 130 may be an operator of a blog, a news site, a web portal, an e-commerce website, a social networking website, or any other publication of web content.

According to embodiments of the present disclosure, content of, links to, and/or previews of a website of one or more ECPs 130 may be published on the website of PCP 125 in order to promote the user 110 who is viewing the website of the PCP to visit the website(s) 25, 35, and/or 45 of the one or more ECPs 130. The CDNS 115 may determine which one or more sponsored links 20, 30, 40 of the one or more ECPs 130 may be published on the website 15 of the PCP 125. The form of sponsored links 20, 30, 40 may be provided as a link to or preview of content, and may include hyper-links, text, images, videos, or any combination of suitable forms.

The CDNS 115 may include any type of server or plurality of servers configured to process content distribution information from publishers, such as PCPs 125 and ECPs 130, promotional, and/or advertising inventory information from the advertisers 135 and/or publishers 125, 130, either directly or indirectly. For example, the CDNS 115 may process parameters relating to which sponsored links 20, 30, 40 an ECP 130, and which type of users 110, the ECP 130 would like to be promoted to on PCP 125 websites 15 in the link exchange network 145. The CDNS 115 may also receive or generate processing parameters of the PCP 125 relating to publishing content from an ECP 130.

In certain embodiments, CDNS 115 may be a remote web server that receives content syndication information from publishers, such as PCPs 125 or ECPs 130, and serves content from publishers, to be placed by other publishers such as PCPs 125 and ECPs 130. The CDNS 115 may be configured to serve content across various domains of publishers such as ECPs 130, for example, based on user 110 information provided by PCPs 125. CDNS 115 may also be configured to serve content based on contextual targeting of web sites, search results, and/or user/viewer information. In some embodiments, the CDNS 115 may be configured to serve content from publishers in the link exchange network 145 based on information, parameters, and/or other instructions received from PCPs 125 and ECPs 130.

In addition, the CDNS 115 may be operated in coordination with one or more separate ad servers 120. Alternatively, in addition to performing the functions described above, the CDNS 115, may also perform the functions of an ad server 120 as described below. Together, one or more ad servers 120 and the CDNS 115 may form an advertising and content network 140.

The advertising and content network 140 may communicate with advertisers 135 and content publishers 125, 130, to receive and save in memory, various parameters and instructions for displaying advertisements and publishing content on various websites. The advertising and content network 140 may receive data regarding users 110, such as information regarding the user's identity, demographics, and/or search history. The components of the advertising and content network, e.g. the ad server 120 and the CDNS 115, may process that user data in view of the various parameters received from advertisers 135 and content publishers 125 and 130, and then transmit to the content publishers what advertisements and/or content to publish so as to achieve a selective targeting of content and advertising to the user 110.

Figure 5:
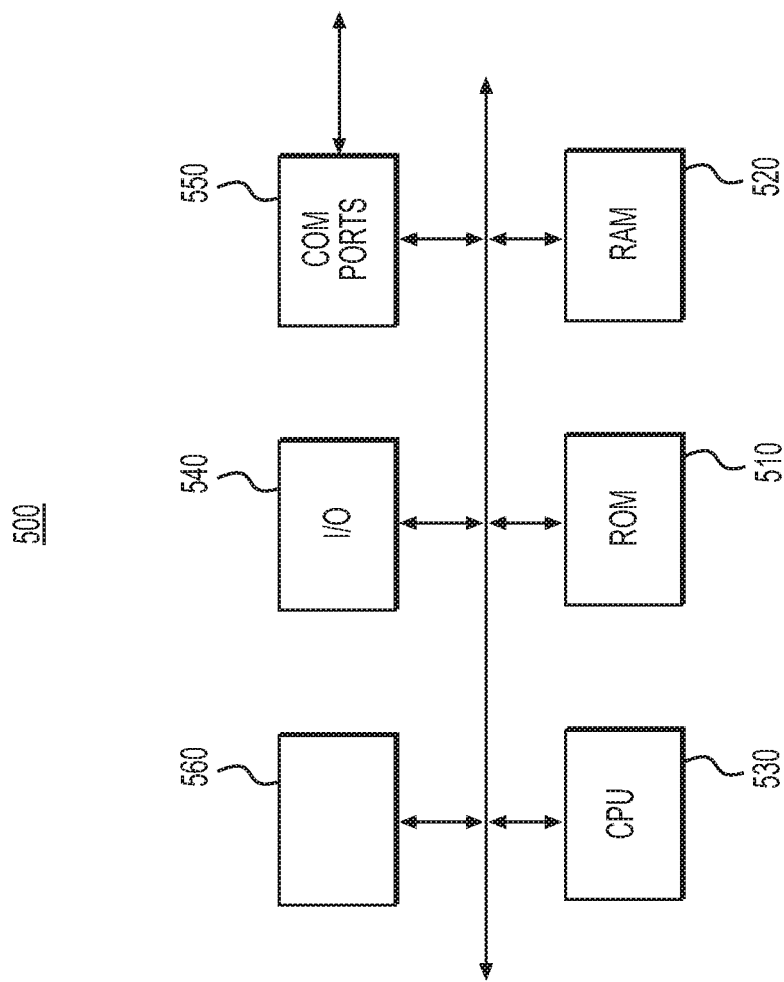
FIG. 5 is a simplified functional block diagram of a computer that may be configured as a host server, for example, to function as a CDNS and/or an advertisement server, according to an exemplary embodiment of the present disclosure.

The CDNS 115 may function to control the syndication or distribution of content and advertising in the advertising and content network 140 and/or the link exchange network 145. The CDNS 115 may include one or more computing systems configured to receive information from entities in environment 100, process the information, and generate instructions for executing distribution of content and/or advertising, according to methods described herein. The CDNS 115 may include any type or combination of computing systems, such as clustered computing machines and/or servers. In one embodiment, as shown in system 500 of FIG. 5, the CDNS 115 may be an assembly of hardware, including a memory 510, 520, a central processing unit ("CPU") 530, one or more communication ports 550, and/or a user interface 540. Memory 510, 520 may include any type of RAM 520 or ROM 510 embodied in a physical storage medium, such as magnetic storage including floppy disk, hard disk, or magnetic tape; semiconductor storage such as solid state disk (SSD) or flash memory; optical disc storage; or magneto-optical disc storage. CPU 530 may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. User interface 540 may include any type or combination of input/output devices, such as a display monitor, keyboard, and/or mouse.

As discussed above, the functions of the advertising and content network 140 may be performed by a combination of an ad server 120 and CDNS 115 or may be performed by CDNS 115 alone. Ad servers 120 may include any type of servers configured to process advertising information from advertisers 135 and/or inventory information from the CDNS 115 and/or publishers such as PCPs 125 or ECPs 130, either directly or indirectly. In certain embodiments, ad servers 120 may be remote web servers that receive advertising information from advertisers 135 and serve ads to be placed by publishers, such as PCPs 125 and ECPs 130. For example, ad servers 120 may receive parameters from advertisers related to user 110 attributes and pricing (e.g. how much the advertiser may be willing to pay for its advertisement to be viewed by a user who matches its user attribute parameters) so that the ad server 120 may save these parameters in memory and then determine, based on information received about the potential viewer of a website and the advertiser parameters whether an advertisement should be shown to the user 110.

Ad servers 120 may be configured to serve ads across various domains of content publishers such as PCPs 125 and ECPs 130, for example, based on advertising information provided by advertisers 135. Ad servers 120 may also be configured to serve ads based on contextual targeting of web sites, search results, and/or user profile information. In some embodiments, ad servers 120 may be configured to serve ads based on information and instructions received from CDNS 115. The ad server 120 and advertisers 135 may be in direct communication with each other and may communicate via computers connected the Internet 105.

Advertisers 135 may include any entities having online advertisements (e.g., banner ads, display ads, rich media ads, pop-ups, etc.) which the advertisers 135 may wish to be displayed to online users 110. Advertisers 135 may interact with PCPs 125, and ECPs 130, ad servers 120, and CDNS 115, directly or indirectly through computers connected to the Internet 105. Thus, advertisers 135 may be able to communicate advertising information, such as ad information, ad sizes, targeting information, consumer information, budget information, etc., to other entities in environment 100.

Figure 3:
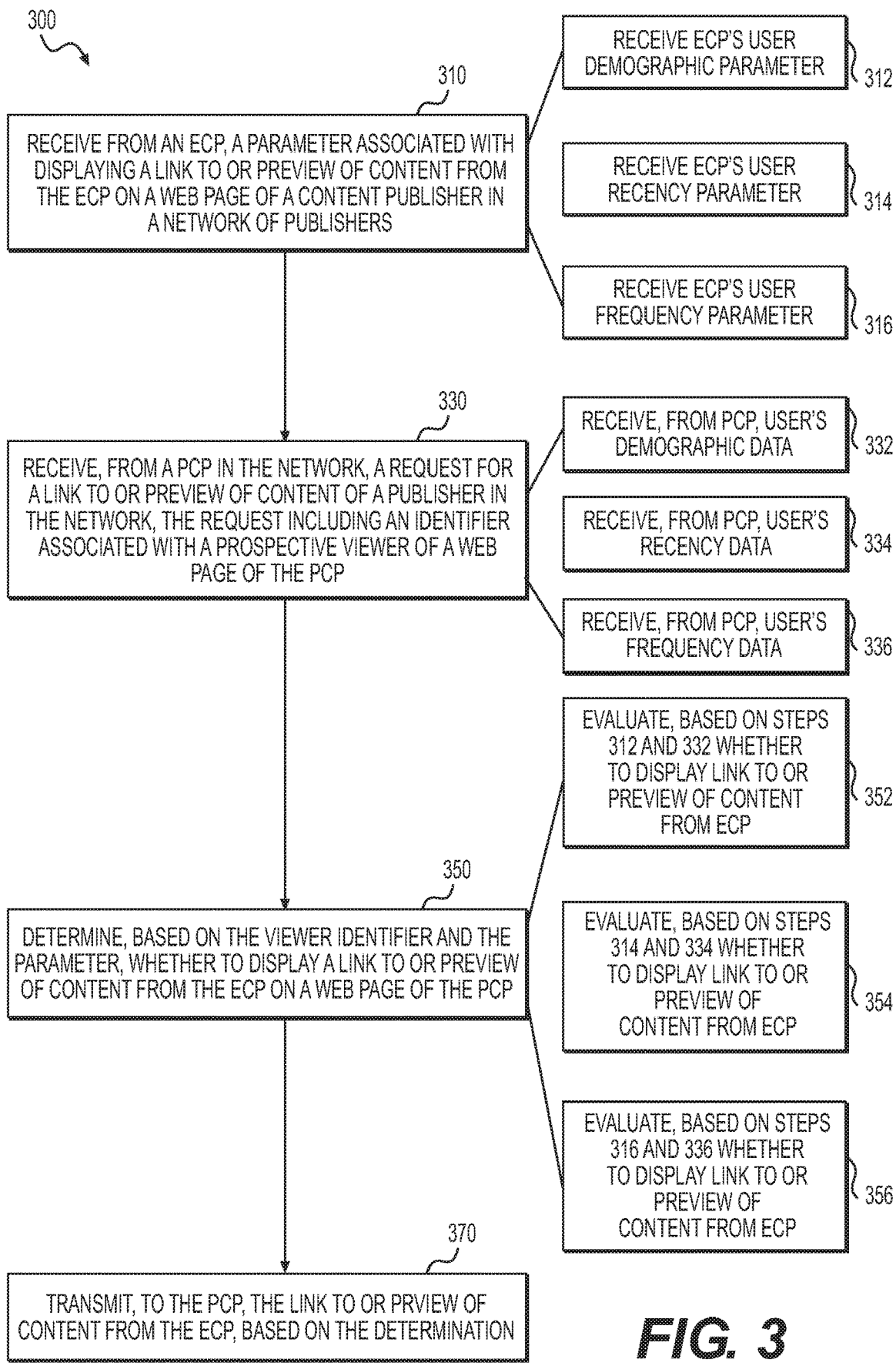
FIG. 3 is a flow diagram of an online environment and systems for managing the distribution of content over the Internet, according to an exemplary embodiment of the present disclosure.

FIG. 3 is a flowchart of a content distribution method 300 consistent with embodiments of the present disclosure. At step 310, ECP 130 may communicate to a server, such as a CDNS 115, one or more user/viewer 110 parameters associated with displaying a link to, or preview of content from the ECP 130 on the website of a content publisher in a network of publishers 145. The ECP 130 may communicate with a server, such as a CDNS 115, via the Internet 105, postal mail, phone, or any other means. The ECP 130 may send the CDNS 115 user/viewer 110 parameters related to the attributes of a user 110 that the ECP 130 would like to view its website 25, 35, and 45.

For example, user/viewer attributes may include: a user's demographics, as shown in step 312, how recently the user 110 has visited the ECP 130 website (recency), as shown in step 314, how frequently the user has viewed the ECP 130 website (frequency), as shown in step 316. A user's attributes and/or demographics may include the user's identity (e.g. email address, name, login identification, unique identifier, phone number, account number, etc.), demographic information (e.g. geographic location, age, gender, profession), search history, browser history, etc.

The user attribute parameters requested by the ECPs 130 may be based on one or more combination of attributes of the user, and may include: users who have visited the ECP 130 website within 1 year, 6 months, 3 months, 1 month, 2 weeks, 1 week, 3 days, 1 day, 8 hours, 5 hours, 2 hours, 1 hour, half an hour or any other increment of time; users who have only visited the ECP 130 website once in the last year, once in the last 6 months, once in the last 3 months, once in the last 1 month, once in the last 2 weeks, once in the last week, once in the last 3 days, once in the last day, once in the last 8 hours, once in the last 5 hours, once in the last 2 hours, once in the last 1 hours, or any other increment of time and/or number; users who do not already have membership to the ECP 130 website based on the user 110 email address, login, unique identifier, phone number, account number, etc.; users who live in a large city, users who live in a rural area, users who live in North America, users who live in the Eastern time zone of North America, users who live in New York city, etc.; users who are above 18, users who are above 25, users who are above 40, users who are below 75, etc.; users who are male, users who are female; users who are engineers, users who are teachers, users who are nurses; users who have searched for job openings, users who have searched for product reviews, users who have searched for airline ticket prices; users who have previously visited shopping websites, users who have visited educational websites, users who have visited financial services websites, etc.

The communication from the ECP 130 to the CDNS 115 as shown in step 310 may also include pricing parameters specifying what price the ECP 130 may be willing to pay for a PCP 125 to show its content to users/viewers 110 who meet the user parameters specified by ECP 130 as discussed above. For example, the request from the ECP 130 may specify that it will pay: x cents for a user who has never visited the website of the ECP 130, 0.75x cents for a user who has not visited the website of the ECP 130 in the last 6 months, 0.50x cents for a user who has not visited the website of the ECP 130 in the last 1 month, y cents for a user who lives in New York city, z cents for a user who is a teacher, etc. In this manner, the ECP 130 may target certain types of users/viewers by selectively controlling which users/viewers it promotes its website to, and may pay a higher price to promote its content to these users/viewers 110.

For example, as shown in FIG. 6, the parameters of demographic attributes 620 of a user and how recently 610 the user may have visited the ECP 130 website may also be linked to a price the ECP 130 may be willing to pay for the PCP 125 to publish a link to or preview to its content. For instance, referring to FIG. 6, if the ECP 130 is interested in targeting users 110 who are students living in New York City who may be interested in buying a new computer (based on the web browser and search history of the user 110), and who may have recently visited the ECP website, or who have not visited the ECP website recently, the ECP may be willing to pay varying prices for the PCP 125 to display its ad to users fulfilling some or all of these varying parameters.

The various user/viewer 110 parameters sent by the ECP 130 and received by the CDNS 115 may be saved in the memory 510, 520 of the CDNS 115 for processing by a processor, like CPU 530.

For example, the ECP 130 may communicate to a server, such as a CDNS 115 that it would like to display a link to or preview of content on a web page of a content publisher to a user/viewer 110 who has visited the website of the ECP 130 fewer than three times in the last 3 months, who is a female, who is not a member of the ECP 130 website, and who has visited a financial services website in the last 3 days, and that it is willing to pay 75 cents for this. The CDNS 115 may then save these parameters in memory.

At step 330, a PCP 125 may communicate with the CDNS 115 requesting one or more links to or previews of content from an ECP 130. The request may also include data on the user 110 attempting to access the website 15 of the PCP 125. Such data may include one or more identifiers associated with a prospective user/viewer 110 of the PCP 125 website 15.

The PCP 125 may communicate with a server, such as a CDNS 115, via the internet, postal mail, phone, or any other means. The PCP 125 may communicate parameters of the request. Such publishing parameters of the request from the PCP 125 may include the type of content from an ECP 130 that the PCP 125 would publish, the space available on the PCP's 125 website available for publishing content from an ECP 130, and/or any other suitable parameters. For instance, the request may include parameters that require the content from the ECP 130 to be published on the PCP 125 website 15 be suitable for viewers of all ages; be text or images only, e.g. no video; and/or take up less than 10% of the PCP webpage; etc.

The communication from the PCP 125 to the CDNS 115 may also include information about the user as stored in a cookie or other storage means. For example, the PCP 125 may send the CDNS 115 the user/viewer's identifying information, frequency, recency, demographic, and any other information. For example, as shown in steps 332, 334, and 336, the user's demographic, recency and frequency data, respectively may be communicated to the CDNS 115.

The communication from the PCP 125 to the CDNS 115 as shown in step 330 may also include pricing parameters specifying a price the PCP 125 may be willing to accept for it to show to users/viewers 110 content from an ECP that meets the publishing parameters specified by PCP 125, as discussed above. For example, the request from the PCP 125 may specify that it will accept at least x cents for publishing content from an ECP that is less than 5% of the area of the PCP webpage, and it will accept at least 2x cents for publishing content from an ECP that is 5-10% of the area of the PCP webpage.

The various parameters sent by the ECP 130 and received by the CDNS 115 may be saved in the memory 510, 520 of the CDNS 115 for processing by a processor, like CPU 530.

At step 350, once the CDNS 115 has received requests from an ECP 130, for example as shown in step 310, and a PCP 125, for example as shown in step 330, the CDNS 115 may determine, based on the parameters in the requests provided by the ECP 130 and PCP 125 in steps 310 and 330 as well as the user/viewer 110 information provided by the PCP 125 in step 330, whether to display a link to or a preview of content from the ECP 130 on a web page of the PCP 125.

In addition, if the link exchange network 145 includes more than two members, and/or more than one request from an ECP 130, the CDNS 115 may determine which link to or preview of content from which ECP 130 to publish on the PCP 125, based on the parameters in the requests provided by the ECP 130 and PCP 125 in steps 310 and 330 as well as the user/viewer 110 information provided by the PCP 125 in step 330, and whether to display a link or a preview of content from the ECP 130 on a web page of the PCP 125.

For example, as shown in steps 352, 355 and 356, the CDNS 115 may retrieve one or more of the various user parameters from the ECP 130 request in steps 310-316, and the various parameters from the PCP 125 request in steps 330-336 to determine whether or not to publish a link to or preview of content of the ECP 130 on the PCP 125 web page.

The CDNS 115 may also retrieve the price payment parameters from the ECP 130 request and the price parameters from the PCP 125 request in the step of determining whether or not to publish a link to or preview of content of the ECP 130 on the PCP 125 web page. The CDNS 115 may use a predetermined algorithm to calculate the determination in step 350 and described above, based on the parameters and/or pricing from the ECP 130 and PCP 125 requests in steps 310 and 330. The algorithm may also account for any fees that CDNS 115 may receive for performing its functions.

At step 370, the CDNS 115 may transmit to the PCP 125 the link to or preview of content from the ECP based on the determination in step 350. The transmitting step 370 may also include communication between the CDNS 115 and the ECP 130 for the CDNS 115 to receive the link to or preview of content from the ECP 130 to be published by the PCP 125.

The transmitting step 370 may also include exchange of payment from the ECP 130 to the PCP 125 via the CDNS 115 for publishing the link to or preview of content from the ECP 130. In addition, the transmitting step 370 may also include exchange of payment from the ECP 130 to the CDNS 115 for performing its services.

Figure 4:
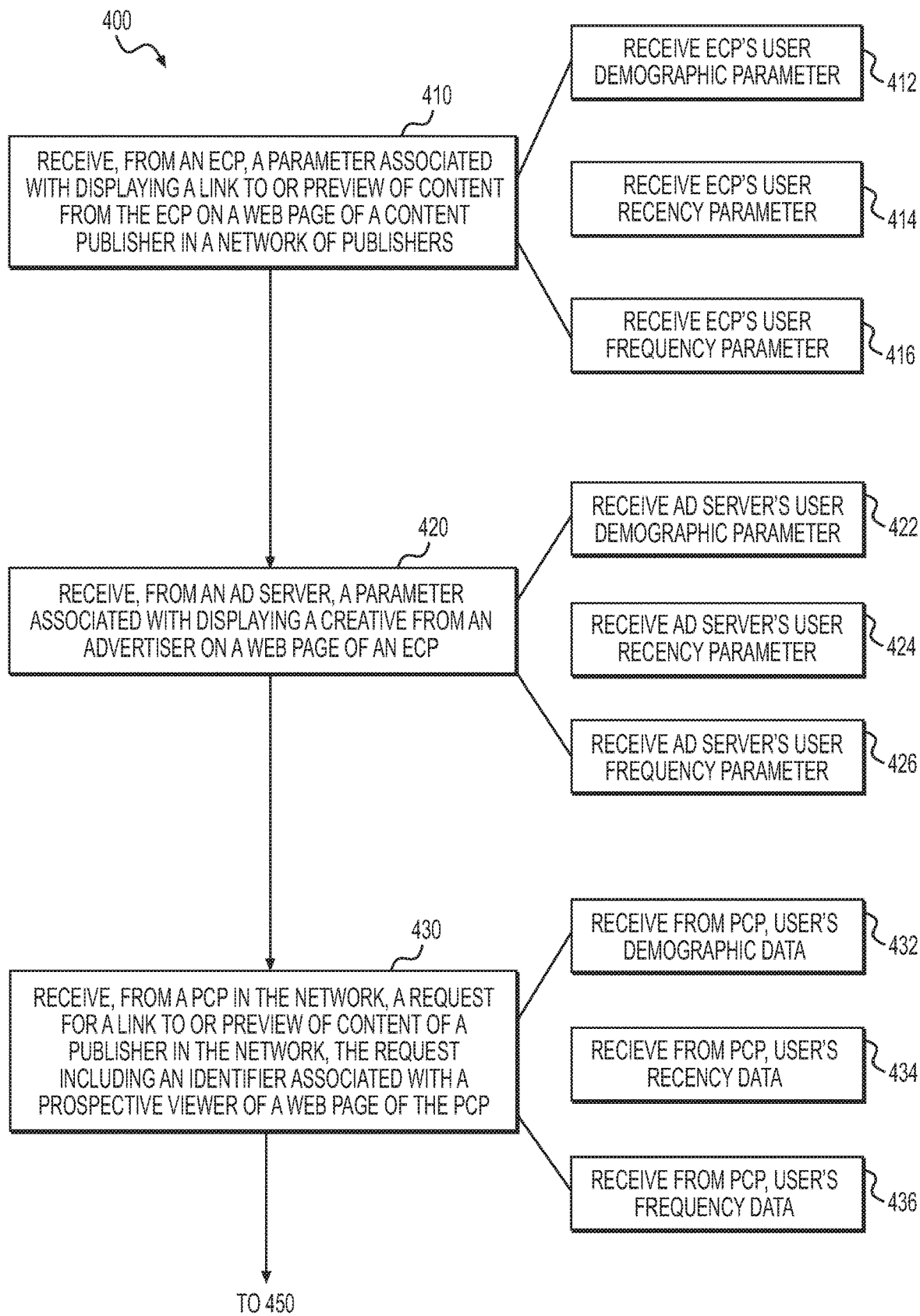
FIG. 4 is a flow diagram of an exemplary method for managing the distribution of content and advertisements over the Internet, according to an exemplary embodiment of the present disclosure.
Figure 4:
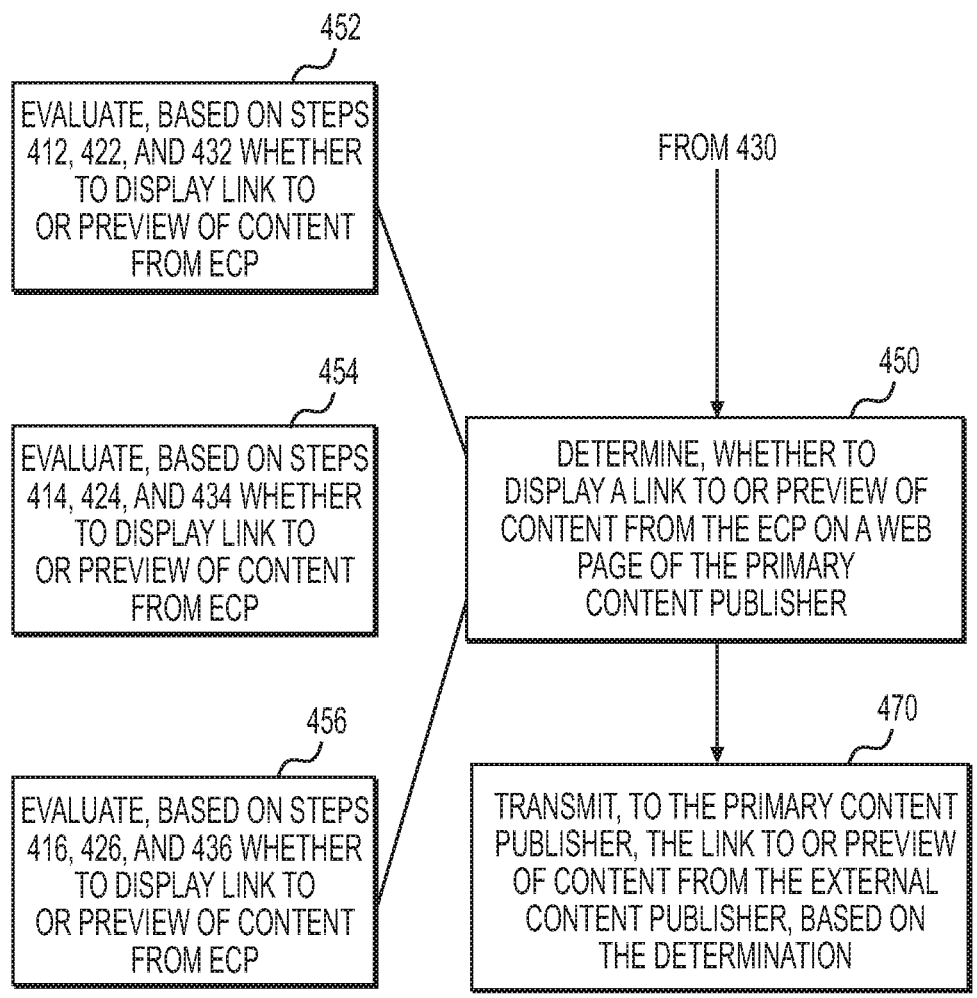

FIG. 4 is a flowchart of a content distribution and advertising method 400 consistent with embodiments of the present disclosure. At step 410, ECP 130 may communicate to a server, such as a CDNS 115, one or more user/viewer 110 attribute parameters associated with displaying a link to, or preview of, content from the ECP 130 on a web page of a content publisher in a network of publishers 145. The ECP 130 may communicate with a server, such as a CDNS 115, via the internet, postal mail, phone, or any other means.

For example, the ECP 130 may communicate with the CDNS 115 user/viewer 110 demographic parameter(s) as in step 412, recency parameter(s) as in step 414, and/or frequency parameter(s) as in step 416.

The parameters associated with displaying a link to, or preview of content communicated by the ECP 130 on a website of a content publisher in a network of publishers 145 may be based on the attributes of a user/viewer 110 that the ECP would like its links or previews of its content to be shown to on a PCP 125 website, similar to the manner as described above in reference to FIG. 3.

The communication from the ECP 130 to the CDNS 115 as shown in step 410 may also include pricing parameters specifying what price the ECP 130 may be willing to pay for a PCP 125 to show its content to users/viewers 110 who meet the user parameters specified by ECP 140, as discussed above in reference to FIG. 3.

The various user/viewer 110 parameters sent by the ECP 130 and received by the CDNS 115 may be saved in the memory 510, 520 of the CDNS 115 for processing by a processor, like CPU 530.

At step 420, ad server 120, may receive from one or more advertisers 135, on which one or more websites, such as an ECP website 25, 35 and 45, it may be displaying its advertisements on over a certain time period. For example, a bank may communicate to the ad server 120, via the Internet 105, that it will be advertising on a financial news content publisher website throughout the month of January.

The advertisers 135 may also communicate to the ad server 120 attributes of users 110 that it would like to view its advertisement and parameters associated with the attributes.

For example, the advertiser 135 may communicate to the ad server 120: at step 422, the user demographic parameter, at step 424, the user frequency parameter, and at step 426, the user frequency parameter. For instance, referring to the previous example, the bank may communicate to the ad server 120 that it would like its advertisement, that is being displayed on the financial news content publisher website, to be seen by users 110 who live in the U.S. and who have visited other financial news content publisher websites at least twice in the last month.

In addition, or alternatively, an advertiser 135 may communicate to the ad server 120 that it has a certain advertising budget for a certain period of time for displaying a particular advertisement or group of advertisements. The communication may also include parameters relating to attributes of users 110 that the advertiser 135 may be willing to pay for its advertisement to be displayed to.

The ad server 120 may receive the parameter(s) from the advertiser(s) 135 via the Internet 105, or any other forms of communication. The ad server 120 may also receive pricing information from the advertiser(s) 135 regarding how much the advertiser(s) 135 may be willing to pay for a user to view its advertisement 65, 70, and 75 displayed on a website, such as an ECP 130 website 25, 35 and 45. The ad server 120 may then communicate the user parameters received from the advertiser(s) 135 to the CDNS 115 via the Internet 105, which the CDNS 115 may save in memory, so that the CDNS 115 may use these parameters in the determination calculation in step 450, as will be explained below. In this manner, an advertiser 135 may selectively target its advertisement to users 110 having certain desirable attributes, and these parameters requested by the advertiser(s) 135 may be added to the calculation in determining which link or preview of content from which ECP 130 (having an advertisement) may be published on the website 15 of a PCP 125.

For example, an advertiser 135 may communicate to the ad server 120 that it has a budget of $10,000 to spend over a period of one month to display a group of advertisements. The advertiser 135 may include in its communication to the ad server, parameters for paying for and displaying its advertisement. For instance, the advertiser may communicate to the ad server 120, that it will pay $0.10 for its advertisements if the advertisement is displayed to users who have visited the advertiser's website fewer than three times in the last three months and who live in a city and who are using a mobile device to access the Internet, and that it will pay $0.40 if the user then goes on to click the advertisement and visits the advertiser's website. In this example, the advertiser 135 has specified user recency, frequency, and demographic parameters, as well as varied advertising prices based on these parameters. The CDNS 115 may base the determination in step 450 as described below, in part on the above described parameters, e.g., advertiser's budget, user attribute parameters, and varied pricing, as saved in the memory of the ad server 420 and/or the CDSN 115.

At step 430, a PCP 125 may communicate with the CDNS 115 requesting one or more links to or previews of content from an ECP 130. The request may include one or more identifiers associated with a prospective user/viewer of a web page of the PCP 125.

The PCP 125 may communicate with a server, such as a CDNS 115, via the internet, postal mail, phone, or any other means. The PCP 125 may communicate parameters of the request. Such publishing parameters of the request from the PCP 125 may include the type of content from an ECP 130 that the PCP would publish, the space available on the PCP's webpage for publishing content from an ECP 130, and other suitable parameters. For instance, the request may include parameters that require the content from the ECP 130 to be published on the webpage of the PCP 125 be suitable for viewers of all ages; be text or images only, e.g. no video; take up less than 10% of the PCP webpage; etc.

The communication from the PCP 125 to the CDNS 115 may also include information about the user as stored in a cookie or other storage means. For example, the PCP 125 may send the CDNS 115 the user/viewer's identifying information, frequency, recency, demographic, and any other information. For example, as shown in steps 432, 434, and 436, the user demographic, recency and frequency data, respectively may be communicated to the CDNS 115.

The communication from the PCP 125 to the CDNS 115 as shown in step 430 may also include pricing parameters specifying at price the PCP 125 may be willing to accept for it to show content from an ECP to users/viewers 110 that meet the publishing parameters specified by PCP 125 as discussed above. For example, the request from the PCP 125 may specify that it will accept at least x cents for publishing content from an ECP that is less that 5% of the area of the PCP webpage, and it will accept at least 2x cents for publishing content from an ECP that is 5-10% of the area of the PCP webpage.

The various parameters sent by the ECP 130 and received by the CDNS 115 may be saved in the memory 510, 520 of the CDNS 115 for processing by a processor, like CPU 530.

In addition, if the link exchange network 145 includes more than two members, more than one advertiser and/or more than one request from an ECP 130, PCP 125, and/or advertiser 135, the CDNS 115 may determine which link to or preview of content from which ECP 130 to publish on which PCP 125, based on the parameters in the requests provided by the advertisers 135, ECPs 130 and PCPs 125 in steps 410-426, as well as the user/viewer 110 information provided by the PCPs 125 in step 430.

At step 450, once the CDNS 115 has received requests from the ECP 130, for example as shown in step 410, the ad server 120, for example in step 420, and the PCP 125, for example as shown in step 430, the CDNS 115 may determine, whether, and which, links to or previews of content from the ECP 130 to publish on which websites of the PCP 125.

The CDNS 115 may also retrieve the price payment parameters from the ECP 130 request, the advertisers 135, and the price parameters from the PCP 125 request in the step of determining whether or not to publish a link to or preview of content of the ECP 130 on the PCP 125 web page. The CDNS 115 may use a predetermined algorithm to calculate the determination in step 450 and described above.

At step 470, the CDNS 115 may transmit to the PCP 125 the link to or preview of content from the ECP based on the determination in step 450. The transmitting step, step 470 may include communication between the ad server 120 and 135 to receive a link to or copy of the advertisement to be displayed on the ECP 130. The transmitting step, step 470 may also include communication between the CDNS 115 and the ECP 130 for the CDNS 115 to receive the link to or preview of content from the ECP 130 to be published by the PCP 125 at step 372. In addition, the transmitting step 470 may also include exchange of payment from the ECP 130 to the PCP 125 via the CDNS 115 for publishing the link to or preview of content from the ECP 130. In addition, the transmitting step 470 may include exchange of payment from the ECP 130 to the CDNS 115 for performing its services.

Example 1

A user may attempt to access the website of a PCP using a web browser on the computer of the user that is connected to the Internet. Prior to the PCP website being displayed to the user, the PCP may send information about the user, such as the user's browser history, and geographic location that is saved in a cookie of the web browser to the CDNS via the Internet. The CDNS may then compare the information about the user sent by the PCP to see if the user's attributes obtained by analyzing the user's information, matches with the parameters of any ECP and the PCP as previously saved in the memory of the CDNS. If there is a match, then the CDNS may determine that the matched ECP should have its sponsored link or content published to the PCP website for viewing by the user.

Example 2

A user may attempt to access the website of a PCP using a web browser on the computer of the user that is connected to the Internet. Prior to the PCP website being displayed to the user, the PCP may send information about the user, such as the user's browser history, and geographic location that is saved in a cookie of the web browser to the CDNS via the Internet. The CDNS may then compare the information about the user sent by the PCP to see if the user's attributes, obtained by analyzing the user's information, matches with the parameters of the advertiser advertising on the ECP, the parameters of the ECP, and the PCP, as previously saved in the memory of the CDNS. If the attributes of the user match with the parameters of the advertiser advertising on the ECP, and the parameters of the ECP and PCP, then the CDNS may determine that the ECP should have its sponsored link or content published to the PCP website for viewing by the user.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for executing online distribution of content, the method comprising:
   receiving, from a first content publisher that publishes a first web page, a request to publish content associated with the first content publisher on a second web page associated with a second content publisher;
   receiving, from the second content publisher, a request for content, the request including at least one identifier associated with a prospective viewer of a web page of the second content publisher;

determining whether the prospective viewer associated with the at least one identifier has previously visited the first web page;

determining a period of time that has elapsed since the prospective viewer associated with the at least one identifier visited the first web page;

determining whether the period of time that has elapsed since the prospective viewer associated with the at least one identifier previously visited the first web page is within a predetermined prior visit time period; and providing for display, to the second content publisher or a device of the prospective viewer, the content of the first content publisher, based on: (i) whether the prospective viewer has previously visited the first web page, (ii) whether the prospective viewer visited the first web page of the first content publisher within the predetermined prior visit time period of the request for content of the second content publisher, and (iii) a comparison of the at least one identifier with at least one attribute of a desired viewer of the first content publisher.

2. The computer-implemented method of claim 1, wherein the at least one identifier associated with the prospective viewer of the web page of the second content publisher includes at least one attribute selected from the group of: geographic location, website history, age, gender, search history, profession, or combinations thereof.

3. The computer-implemented method of claim 1, wherein the at least one identifier associated with the prospective viewer of the web page of the second content publisher is selected from the group of: recency, frequency, demographic, email address, or combinations thereof.

4. The computer-implemented method of claim 1, further comprising a step of determining, based on the comparison of the at least one identifier with the at least one parameter, whether to display a link to or preview of content of the first content publisher on the web page of the second content publisher.

5. The computer-implemented method of claim 4, wherein the request from the second content publisher includes a minimum price it will accept to display a link to or preview of content of the first content publisher.

6. The computer-implemented method of claim 4, wherein the step of determining whether to display the link to or preview of content of the first content publisher on the web page of the second content publisher is further based on a price the first content publisher will pay for a content publisher to display a link to or preview of the content, and a minimum price the second content publisher provided will accept to display a link to or preview of the content.

7. The computer-implemented method of claim 4, further comprising a step of receiving, from an advertiser, at least one parameter associated with paying for the prospective viewer of the webpage of the second content publisher to view an advertisement displayed on the webpage of the first content publisher.

8. The computer-implemented method of claim 7, wherein the at least one parameter associated with paying for a prospective viewer to view the advertisement is selected from the group consisting of: viewer recency, viewer frequency, viewer demographic, or any combination thereof.

9. The computer-implemented method of claim 7, wherein the step of determining whether to display the link to or preview of content of the first content publisher on the web page of the second content publisher further comprises comparing the at least one identifier with the at least one parameter associated with paying for a prospective viewer to view the advertisement, to determine whether to display a link to or preview of content from the first content publisher on the web page of the second content publisher.

10. A system for executing online distribution of content, the system including:

a computer readable data storage device storing instructions for executing an distribution of content; and a processor configured to execute the instructions to perform a method including:

receiving, from a first content publisher that publishes a first web page, a request to publish content associated with the first content publisher on a second web page associated with a second content publisher;

receiving, from the second content publisher, a request for content, the request including at least one identifier associated with a prospective viewer of a web page of the second content publisher;

determining whether the prospective viewer associated with the at least one identifier has previously visited the first web page;

determining a period of time that has elapsed since the prospective viewer associated with the at least one identifier visited the first web page;

determining whether the period of time that has elapsed since the prospective viewer associated with the at least one identifier previously visited the first web page is within a predetermined prior visit time period; and transmitting, to the second content publisher or a device of the prospective viewer, the content of the first content publisher, based on: (i) whether the prospective viewer has previously visited the first web page, (ii) whether the prospective viewer visited the first web page of the first content publisher within the predetermined prior visit time period of the request for content of the second content publisher, and (iii) a comparison of the at least on identifier with at least one attribute of a desired viewer of the first content publisher.

11. The system of claim 10, wherein the method further includes a step of determining, based on the comparison of the at least one identifier with the at least one parameter, whether to display a link to or preview of content of the first content publisher on the web page of the second content publisher.

12. The system of claim 11, wherein the step of determining whether to display the link to or preview of content of the first content publisher on the web page of the second content publisher is further based on a price the first content publisher will pay for a content publisher to display a link to or preview of the content, and a minimum price the second content publisher provided will accept to display a link to or preview of the content.

13. The system of claim 12, wherein the method further comprises a step of receiving, from an advertiser, at least one parameter associated with paying for the prospective viewer of the webpage of the second content publisher to view an advertisement displayed on the webpage of the first content publisher.

14. The system of claim 13, wherein the at least one parameter associated with paying for a prospective viewer to view the advertisement is selected from the group consisting of: viewer recency, viewer frequency, viewer demographic, or any combination thereof.

15. The system of claim 10, wherein the method further comprises a step of determining, based on a comparison of the at least one identifier with the at least one parameter associated with paying for a prospective viewer to view the advertisement, to determine whether to display a link to or preview of content of the first content publisher on the web page of the second content publisher.

16. A computer-readable medium storing instructions that, when executed by a processor, cause the processor to execute online distribution of content, including:
  receiving, from a first content publisher that publishes a first web page, a request to publish content associated with the first content publisher on a second web page associated with a second content publisher;
  receiving, from the second content publisher, a request for content, the request including at least one identifier associated with a prospective viewer of a web page of the second content publisher;
  determining whether the prospective viewer associated with the at least one identifier has previously visited the first web page;
  determining a period of time that has elapsed since the prospective viewer associated with the at least one identifier visited the first web page;
  determining whether the period of time that has elapsed since the prospective viewer associated with the at least one identifier previously visited the first web page is within a predetermined prior visit time period; and
  transmitting, to the second content publisher or a device of the prospective viewer, the content of the first content publisher, based on: (i) whether the prospective viewer has previously visited the first web page, (ii) whether the prospective viewer visited the first web page of the first content publisher within the predetermined prior visit time period of the request for content of the second content publisher, and (iii) a comparison of the at least one identifier with at least one attribute of a desired viewer of the first content publisher.

17. The computer-readable medium of claim 16, wherein the instructions further include determining, based on the comparison of the at least one identifier with the at least one parameter, whether to display a link to or preview of content from the first content publisher on the web page of the second content publisher.

18. The computer-readable medium of claim 17, wherein the step of determining whether to display a link to or preview of content from the first content publisher on the web page of the second content publisher is further based on a price the first content publisher will pay for a content publisher to display a link to or preview of the content, and a minimum price the second content publisher provided will accept to display a link to or preview of the content.

19. The computer-readable medium of claim 18, wherein the instructions further include receiving, from an advertiser, at least one parameter associated with paying for the prospective viewer of the webpage of the second content publisher to view an advertisement displayed on the webpage of the first content publisher.

20. The computer-readable medium of claim 19, wherein the step of determining whether to display the link to or preview of content of the first content publisher on the web page of the second content publisher is further based on at least one parameter associated with paying for a prospective viewer to view the advertisement selected from the group consisting of: viewer recency, viewer frequency, viewer demographic, or any combination thereof.

* * * * *